Dec. 16, 1969  J. L. BURDOCK ET AL  3,483,678
APPARATUS FOR REMOVING SUSPENDED PARTICLES FROM GASES
Filed May 29, 1967  2 Sheets-Sheet 1

INVENTORS:
Joseph L. Burdock
Angelo J. Cioffi
BY: James R. Hoatson, Jr.
Philip T. Liggett
ATTORNEYS

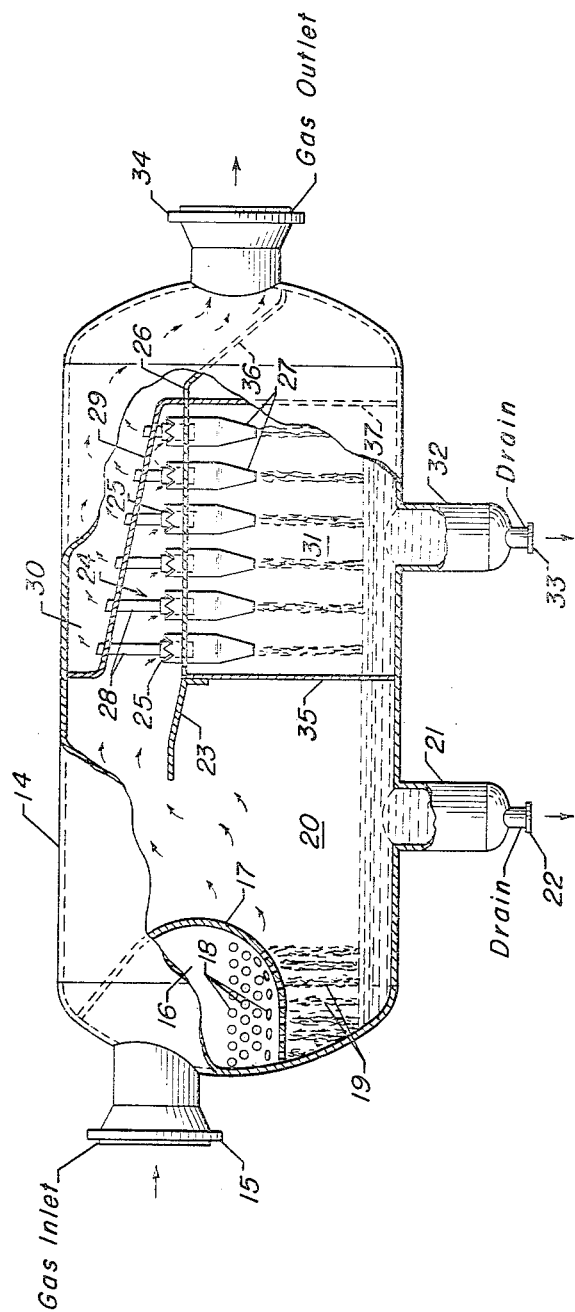

United States Patent Office 3,483,678
Patented Dec. 16, 1969

3,483,678
APPARATUS FOR REMOVING SUSPENDED PARTICLES FROM GASES
Joseph L. Burdock, Old Greenwich, and Angelo J. Cioffi, Greenwich, Conn., assignors to Universal Oil Products Company, Des Plaines, Ill., a corporation of Delaware
Continuation-in-part of application Ser. No. 353,500, Mar. 20, 1964. This application May 29, 1967, Ser. No. 641,772
Int. Cl. B01d 45/08
U.S. Cl. 55—348                    2 Claims

ABSTRACT OF THE DISCLOSURE

A unitary liquid and particle separator system for gas streams having baffling to effect a first stage of separation between gas and liquid and, in addition, a second stage of separation which comprises a mulitube centrifugal separator section that is particularly adapted to effect removal of remaining entrained mist or fine liquid droplets.

---

This application is a continuation-in-part of our presently filed application, Ser. No. 353,500, filed Mar. 20, 1964, now abandoned.

The present invention relates to apparatus for removing suspended particles from gas, and particularly for removing both slugs and fine droplets of suspended liquids, with or without solids, from a natural gas stream.

Natural gas as it comes from the wells generally contains suspended particles or droplets of liquids such as condensed heavier hydrocarbons and water and may contain fine solid particles. The particles may range down in size to a few microns and form a fine mist in the gas. These particles must be separated and removed from the gas before it is delivered for commercial use.

The fine, mist-like particles can be most effectively separated from the gas in a multitube centrifugal separator. This type of separator comprises a large number of small tubes open at both ends into each of which an open-ended off-take pipe extends through one end to form an annular passage between the pipe and the inner surface of the outer tube and terminating at a distance from the other open end of the tube. The gas stream delivered to the multitube separator divides into a number of streams, with one for each tube. At each tube there is a tangential inlet or vane means so that the gas stream passes in the annular passage of the tube in a spiral path into the open end of the off-take pipe. During this passage, the fine particles are thrown to the inner surface of the tube while the cleaned gas is drawn upwardly into the off-take pipe from which it is delivered to an off-take chamber.

The small diameter of the tubes, which may be as small as one inch, provides a maximum of centrifugal force for a given velocity. Separation of the particles is also aided by the shortness of the path in the annular passageway through which the particles must pass transversely of the gas stream to the inner surface of the tube. The amount of particles separated in the tube forms a film which passes to the delivery end of the tube and into a collecting chamber.

In a vertically disposed form of apparatus for separating the suspended particles from the gas, the multitube centrifugal unit is mounted in the upper part of a vertical cylindrical casing, a cylindrical casing having the advantage, among others, of being best suited for gas under heavy pressure. The gas enters the casing below the multitube unit through an inlet and flows upwardly through a narrow annular passage between the collecting container of the multitube unit and the wall of the casing to the inlets to the tubes above the collecting container. In a more or less horizontal form of separator system, the multitube separator section will be positioned downstream from a first stage baffled section.

In the gas mains leading to the casing there is some separation of liquid due to particles collecting on the inner surface of the mains and to settling of larger particles. The liquid thus separated, in time, accumulates in the lower part of the mains. When this accumulation of liquid becomes sufficient to form a substantial obstacle to the gas flow, it is swept along by the gas flow as a flood and is carried by the force of the gas flow into the casing of the separating apparatus.

Without a first stage of liquid separation means, the liquid thus carried into the unit introduces a concentration of large particles or drops or slugs of liquid which are carried by the gas passing through the passage about the collecting chamber of the multitube unit to the several centrifugal tubes. The entrance of this entrained liquid floods the narrow spaces in the centrifugal tubes, particularly the annular spaces between the inner surface of the centrifugal tubes and the off-take tubes. Since the pressure below the off-take pipe is necessarily greater than that at the delivery end in order to cause a gas flow, the flood of liquid is forced through the off-take pipe into the collecting chamber of the multitube assembly and from thence is carried into the delivery main. This defeats the purpose of the separator and introduces a destructive element in the gas delivered as the liquid delivered to the delivery main may injure the pumping equipment if the gas is to be pumped to fuel mains or may injure the apparatus of petro-chemical plants if it is used for these industries.

SUMMARY OF THE INVENTION

Our invention provides means to intercept and remove the main flood of liquid reaching the separator unit before it can reach the multitube separators and thus avoid flooding them.

In one embodiment of our invention, we provide a large perforated tube from the inlet to the separator casing that extends from such inlet to the interior of the casing below the multitube separator assembly and turns downwardly, preferably at the axis of the casing. The lower end of the tube is baffled or closed except for openings therein. These openings which may, for example, be one or one and a half inches in diameter are not only in the closed bottom of the tube but also for a distance upwardly therefrom in the vertical part of the tube.

The liquid in the flood of gas and liquid is caused by its mass and momentum to impinge on the bottom of the tube and flow out through the openings in streams into the quiescent space below while the gas, having slight inertia and slight resistance to change in direction of flow, passes through the openings above and thence to the multitube separator. In other words, as shown in one embodiment of the drawing, this liquid is permitted to merely flow out of the lower holes of the "bullnose" type of large tube, without frothing or without being sprayed outwardly to cause mist. In another embodiment, the initial flood of liquid will impinge on perforate plate means and be, in effect, caused to run down to a liquid collection section. This avoids carrying a flood of liquid to the multitube separators and enables the multitube separator to operate normally.

The invention is illustrated, by way of example, in the accompanying drawings.

DESCRIPTION OF THE DRAWINGS

FIGURE 2 of the drawing illustrates a horizontal type of liquid-particle separator system.

Figure 1:
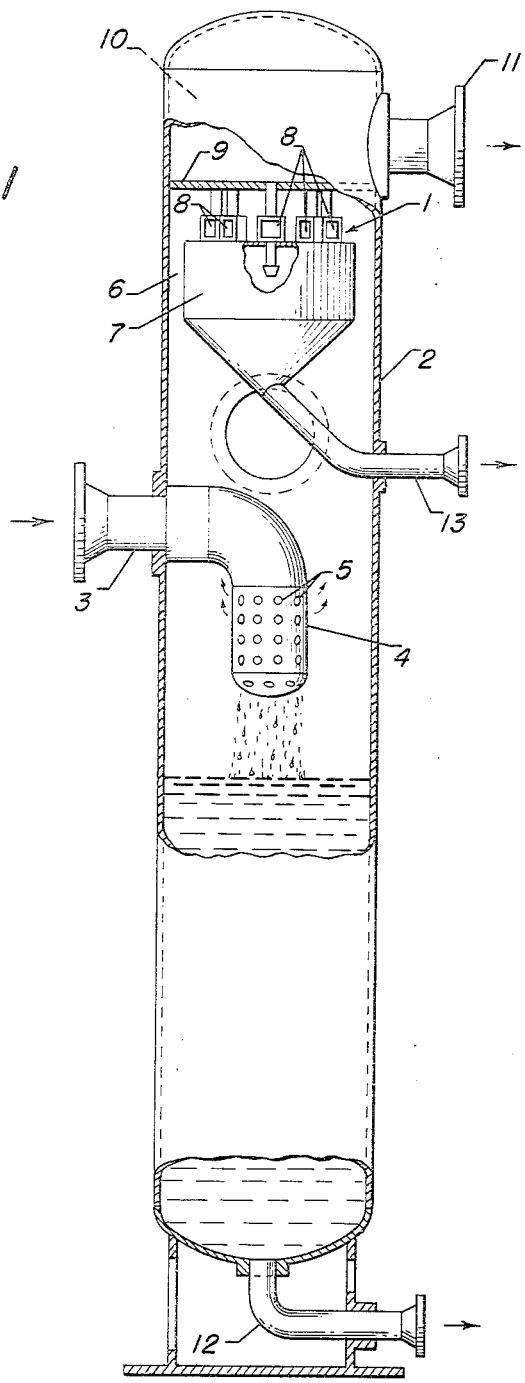
FIGURE 1 of the drawing shows diagrammatically a vertically disposed type of liquid-particle separator system.

In the embodiment of the invention shown in FIGURE 1 of the drawing, a multitube centrifugal separator 1 is mounted in a casing 2 of a vertical cylindrical form into which the gas to be treated is supplied through a nozzle to an inlet pipe 3. This pipe, which provides a first stage separation section, extends to approximately the axial center of the casing 2 and thence curves downwardly to a closed end foraminous portion 4. This end portion is of the nature of a perforated impingement baffle member and is provided with a number of openings 5 in the bottom and in the vertical part upwardly from the end. These openings may be of any suitable shape and size and are so spaced as to provide surfaces on which the suspended drops of liquid will impinge. The liquid will therefore impinge on the bottom and adjacent portions of the tube and flow out through the openings in the bottom and lower part of the tube in streams or large masses into the quiescent space below the end of the tube while the gas flows out through the openings in the upper part of the pipe or tube and rise upwardly to the multitube separator without effecting frothing or spray formation.

The gas, thus free of the main portion of carried along liquid passes to the second stage of liquid-particle separation comprising the multitube separator unit through an annular space 6 between the inner surface of the casing and the collecting container 7 of the multitube separator. Then the gas passes to the intake section of the separator unit, as provided by the space above the container 7, and into the inlets 8 of the centrifugal tubes. The cleaned gas reverses its direction of flow and passes up through outlet pipes extending through a partitioning and support plate means, such as tube sheet 9, into the gas off-take section or collecting chamber 10 and thence to the delivery main through an outlet pipe 11. The liquid collected in the bottom part of the casing is withdrawn through a drain outlet 12 and the liquid collected in the container 7 is withdrawn through a drain outlet 13. Alternatively, the drain from container 7 may descend as a dip-leg arrangement and terminate in the quiescent zone in the lower end of chamber 2 and the recovered liquid discharged through line 12 with the other separated liquid.

The rate of liquid withdrawal from the lower end of the chamber is generally controlled by a liquid level controller means which require a quiescent zone for efficient operation. This quiescent zone is accomplished in the present embodiment by the use of the down turned perforate pipe which in turn permits the initial separation of gas and liquid such that the latter descends in the plurality of gravity flow streams with no velocity impact.

Referring now to FIGURE 2 of the drawing there is shown a separator unit with housing 14 adapted to be in a substantially horizontal position. The gas stream to be treated is supplied through inlet nozzle 15 and then enters a relatively small first stage separation zone 16 provided by a perforated baffle plate 17 that extends laterally across the interior of the main chamber of housing 14. A preferred design has a multiplicity of perforations or holes 18 only within the lower portion of plate 17 such that there will be no direct flow or spray of gas and entrained liquid into the inlet of the second stage multiple tube centrifugal separation section 24. The holes 18 may vary in size or shape but, in accordance with the present invention, will be such as to preclude a spray or frothing effect.

For example, the holes may be of the order of three-fourths of one inch in diameter, or larger, and in sufficient number to provide one and one-half times the internal cross-sectional area of the gas inlet 15. Thus, slugs of liquid carried to the separator unit with the gas stream will impinge against the inside of plate 17 and run to the lower portion of section 16 and, thence, from the holes 18 in the lower portion of the plate 17 there will be a plurality of streams 19 running or dripping into the lower quiescent portion of an interior liquid collection section 20. This first stage of separation will, of course, remove a major portion of previously condensed liquid that carries along in a particular pipe line or whatever. Liquid from section 20, in the present embodiment, descends into a sump section 21 and is then discharged by way of drain 22.

The gas stream portion leaving the holes 18, after the initial separation stage, will be stopped in lower lateral flow by a partition 35 and also will be caused to carry around a splash shield or baffle 23 and enter the intake section of a multitube centrifugal scrubber unit 24. The latter unit provides a high degree of liquid and/or solid particle separation by utilizing a multiplicity of high efficiency cyclone tube separator devices 25. A lower tube sheet 26 supports the lower separator and collector tubes 27, while the open-ended gas outlet pipes 28 extend upwardly through an upper tube sheet 29 which defines the top of scrubber unit 24 or the lower surface of a tapering gas off-take or gas outlet section 30. Vane means, not shown, within the top portion of each tube 27 provides centrifugal separation of particles to the inside wall of each tube so that resulting streams or droplets of liquid will fall to the lower portion of a collection section 31. From the latter, liquid is discharged by way of sump section 32 and drain means 33. For liquid withdrawal purposes it is again desirable to have a quiescent body of liquid for efficient operation of any of the conventional types of liquid level controllers. In this embodiment, it will be noted that there is obtained substantial quiescence in both the zones 20 and 31 by reason of the gravity flow of liquid from, respectively, section 16 and from the plurality of collector tubes 27.

Substantially liquid free gas streams pass to the upper section 30, by way of the tubes 28, and then from section 30 by means of outlet nozzle 34 a single cleaned gas stream can be discharged from the system. Additional partition means 36 and 37 within the downstream end of the chamber 14 serve to seal off and confine the separate gas and liquid collecting sections 30 and 31, respectively.

It is not intended to limit the horizontal embodiment of the present invention to the exact design shown in the drawing inasmuch as various size, location, and structural modification can be made within the scope of the invention. However, a preferred design for the centrifugal separator unit or section 24 provides a tapering gas inlet section so that the total of the velocity and static pressure is held substantially uniform for each unit through the multitube separator section, whereby each separator device 25 will operate at a maximum efficiency and substantially equally.

We claim as our invention:

1. Apparatus for separating suspended particles from a gas stream which comprises:
  (1) a horizontal casing having a first endwall and a second endwall defining a unitary chamber;
  (2) vertical partitioning means within and extending laterally across said chamber dividing the lower portion thereof into a first stage fluid collection section and a second stage fluid collection section;
  (3) a gas inlet through said first endwall above said first stage fluid collection section;
  (4) baffle plate means within the casing positioned adjacent said first endwall and extending laterally across said chamber and enclosing said gas inlet, the lower portion of said baffle plate means having spaced openings therethrough and the upper portion thereof being substantially imperforate, said baffle plate means substantially blocking the direct flow path of the incoming gas stream from said inlet while effecting substantially separate downward discharge of liquid to said first stage collection section and separate discharge of gas from the upper of said spaced openings;

(5) a horizontal partitioning and support plate means extending laterally across said chamber between said vertical partitioning means and said second endwall forming an upper cleaned gas off-take section and an intermediate gas intake section;
(6) a multitube centrifugal separator positioned internally in said chamber and spaced above said second stage fluid collection section and depending from and connecting with said support plate means, said centrifugal separator receiving gas from said gas intake section and delivering cleaned gas to the said off-take section;
(7) open gas passageway means extending longitudinally from the downstream side of said baffle plate means to said intake section;
(8) open passageway means from said gas off-take section to a gas outlet from said chamber; and
(9) separate fluid discharge outlets from said first and second stage fluid collection sections.

2. The apparatus of claim 1 further characterized in that said partitioning and support plate means forming the gas intake section to said multitube separator includes baffling providing a decreasing cross-sectional area in the direction of gas flow whereby to maintain uniform static pressure through such separator.

References Cited

UNITED STATES PATENTS

| | | | |
|---|---|---|---|
| 391,850 | 10/1888 | Jones | 55—410 |
| 929,270 | 7/1909 | Ashton | 55—329 |
| 2,372,514 | 3/1945 | Pootjes | 55—343 |
| 2,467,408 | 4/1949 | Semon | 55—462 |
| 2,551,890 | 5/1951 | Love | 55—343 |
| 2,594,490 | 4/1952 | Patterson | 55—345 |
| 2,655,905 | 10/1953 | Rehm | 55—444 |
| 2,670,056 | 2/1954 | Rossiter | 55—344 |
| 2,792,075 | 5/1957 | McBride et al. | 55—349 |
| 2,818,175 | 12/1957 | Thomas | 209—144 |
| 3,074,218 | 1/1963 | O'Dell et al. | 55—343 |
| 984,212 | 2/1911 | Gray | 261—115 |
| 1,473,449 | 11/1923 | Stearns et al. | 261—115 |
| 399,427 | 3/1889 | Moore | 55—201 |

HARRY B. THORNTON, Primary Examiner

BERNARD NOZICK, Assistant Examiner

U.S. Cl. X.R.

55—418, 462; 209—211; 210—512